Feb. 18, 1930.  W. M. MAYER  1,747,783
COUPLING
Filed Nov. 15, 1923
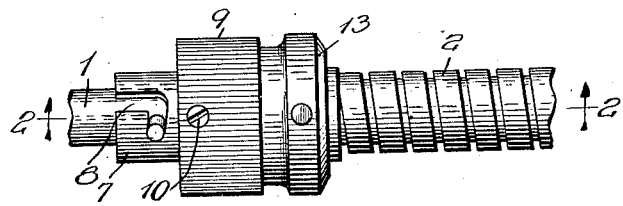
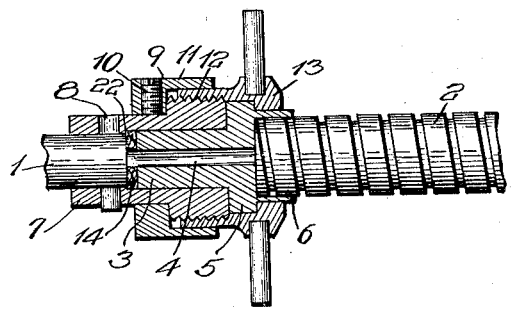
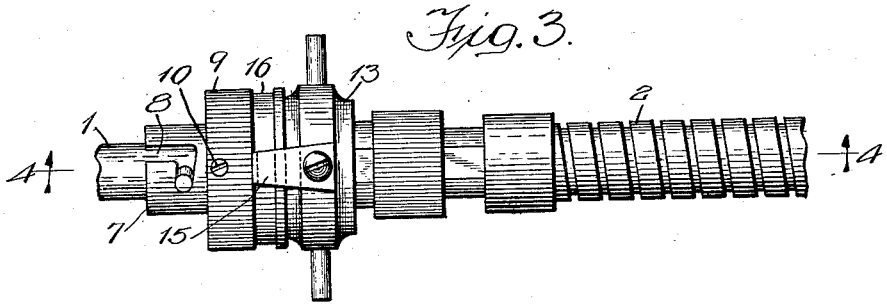
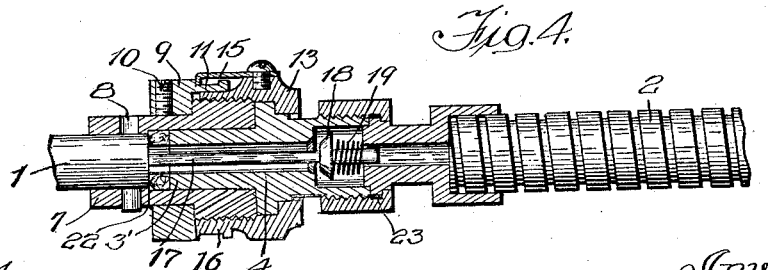

Patented Feb. 18, 1930

1,747,783

UNITED STATES PATENT OFFICE

WALTER M. MAYER, OF GLENCOE, ILLINOIS

COUPLING

Application filed November 15, 1923. Serial No. 674,925.

My invention relates to an improvement in a coupling and more particularly to a coupling intended for use with a means for forcing lubricant under pressure into suitable receptacles, such as oil or grease cups, or the like.

The invention has among its objects the production of a device of the kind described, which may be easily and conveniently applied, or removed, will fit extremely tight so as to absolutely prevent any leakage between the parts and prevent the accidental separation of the coupling from the grease cup while in use.

The invention has among its other objects the production of a device of the kind described, which will be neat and attractive in appearance, simple, convenient, durable, satisfactory and efficient for use wherever found applicable.

Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts:

Fig. 1 is a side view of one form of my device;

Fig. 2 is a section of the same;

Fig. 3 is a side view of a modified form of my device; and

Fig. 4 is a section of the same.

In the drawings, wherein I have illustrated the preferred embodiments of my invention, 1 indicates a grease fitting or cup, nipple or the like to which oil or grease is to be supplied, preferably under pressure, so as to insure that the lubricant will reach all of the vital parts of the mechanism and overcome any clogging.

A grease gun or other device or mechanism for supplying lubricant under pressure is preferably used and has a conduit 2, either flexible or rigid, leading from its reservoir. A tubular member 3 is provided as an extension for the conduit 2, said tubular member having a bore 4 therethrough and provided with an annular flange 5 intermediate its ends. This tubular member may be secured to the end of the conduit, as at 6, in any desired or suitable manner as by soldering, brazing, or the like.

A coupling sleeve 7 is arranged to be slidably and rotatably mounted on the tubular part 3 as shown and adapted to bear against one end of the flange 5. This sleeve is of greater length than that portion of the tubular part 3 between the flange and the free end, so that the projecting portion of the sleeve may receive or encircle the fitting or grease cup 1. Any suitable means may be provided for detachably interconnecting the sleeve to the grease cup, as for instance, a bayonet joint 8, as shown, or its equivalent.

In order to more conveniently manually grasp and rotate the coupling part 7, a sleeve 9 is secured thereto, as by a set screw 10, the exterior of said sleeve being knurled or otherwise suitably roughened or constructed for the purpose. The flange portion 11 of the sleeve encircles and is spaced from the threaded portion 12 of the coupling.

A tubular part 13 is slidably and rotatably mounted on the tubular member 3 on the side of the flange away from that on which the coupling member 7 is mounted, said member 13 adapted to enter into the space between the opposed surfaces of the flange 11 and the threads 12 and having screw threads to cooperate with the threads 12.

It is obvious that when the member 13 is rotated in one direction that it will draw the coupling sleeve tight against the flange 5 of the tubular part 3 and thus prevent any rotational movement therebetween and prevent leakage between the parts.

A gasket 14 may be and is preferably arranged in the sleeve 7 so as to engage between the ends of the fitting or grease cup and tubular part 3 and prevent leakage therebetween when the device is in operation. As shown, I provide a slight shoulder 22 which prevents the gasket or washer from accidentally becoming lost or dropping out of the coupling when detached from the fitting.

In use, the free end of the sleeve is easily slipped onto the grease cup 1 and then turned so as to interengage the bayonet joint or other locking means, after which the part 13 is rotated to clamp the parts together and further tighten the engagement of the bayonet joint and absolutely prevent any movement between the coupling and the grease cup. Thus a tight, leak-proof joint is obtained. The ease or speed of operation is not interfered with and the coupling parts may be quickly backed off, when desired.

In the construction shown in Figs. 3 and 4, the parts 9 and 13 are limited in their separation by means of a bar 15 extending from one of the parts, as for instance the part 13, and slidably engaging in a wide groove 16 on the exterior of the part 9. It may be mentioned that this particular feature or its equivalent may be employed upon the construction shown in Figs. 1 and 2 if desired. With either construction, applying pressure to the bar 15 will cause a frictional engagement between the parts so that turning part 13 will cause a turning of the cooperating part 9 if it is desired to operate the device in this manner. This particular type of coupling is intended to be installed on various hose connections or the like now on the market, and is therefore in the nature of auxiliary equipment or a replacement. In this modification a valve 17 is arranged in the bore 4 through the tubular part 3', the head of the valve seating against one end of the bore, as at 18, and the other end of the valve extending slightly beyond the end of the part 3 so that when the coupling is tightened against the grease cup the valve will be pushed inwardly to lift it from its seat. A compression spring 19 may be arranged to normally maintain the valve upon its seat.

The fitting is also provided with a shoulder 22 for preventing accidental displacement of the gasket or washer 21. I have also shown a packing member 23 provided for preventing leakage at that point.

This type of coupling is especially desirable where light liquids are used, so that the liquid is not spilled when the coupling is removed. It is well known that with a device of this nature there will be a partial vacuum formed in the valve chamber when the coupling is released from the cup 1, this vacuum serving to hold the liquid in the valve chamber and preventing its dripping.

Another advantage of this type of coupling is that it may be transferred from cup to cup without previously relieving the pressure of the lubricant within the conduit 2 before removing from one cup to apply on the next. Where the pressure is not relieved, upon the application of the device to a fitting and then tightening the same down, the pressure in the hose will cause a portion of the grease or lubricant to be shot into the bearing like a blow rather than a steady increase in pressure as in the case where the gun is operated, thereby serving at times to start the grease in the bearing where it might otherwise be somewhat hard to get it moving owing to the condition of the bearing.

Obviously the type of coupling shown in Figs. 1 and 2, with the conduit attached directly to the coupling, may be provided with a valve similar to the valve 18 shown in Fig. 4 if so desired. When the coupling is provided with the valve, the valve may be employed or omitted as desired, it being understood that the coupling may be sold or used with or without the valve.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In combination, a conduit having a tubular extension at its end, a sleeve slidable and rotatable on said extension and having means for detachable engagement with a grease cup, a valve in the bore of said tubular member and controlling the passage therethrough and extending therebeyond, a compression spring normally adapted to press said valve on its seat, a member rotatable and slidable on said tubular member and means on said member interengageable with said sleeve so as to draw said sleeve and tubular member into clamping engagement when rotated in one direction, and means for limiting the separation of said parts.

2. In combination, a conduit having a detachable tubular extension at its end, a sleeve flanged at its inner end slidable and rotatable on said extension and having means at its outer end for detachable engagement with a grease cup, a valve in the bore of said tubular member and controlling the passage therethrough and extending therebeyond, a compression spring normally adapted to press said valve on its seat, a member rotatable and slidable on said tubular member and means on said member interengageable with said flange on said sleeve so as to draw said sleeve and tubular member into detachable clamping engagement when rotated in one direction, and means for limiting the separation of said parts.

3. In combination, a conduit having a tubular extension member at its end, a coupling sleeve rotatable on said extension member and having means whereby it may be detachably connected to a grease cup, a threaded portion on said coupling sleeve, a tubular part movable on the tubular extension member and having adjustable threaded connection with the threads on said coupling sleeve, a second sleeve mounted upon and secured to the coupling sleeve, and a flange on the second sleeve extended over said threaded portions.

4. In combination, a conduit having a tubular extension member at its end, a coupling sleeve rotatable on said extension member and having means whereby it may be detachably connected to a grease cup, a tubular part mounted for rotation on the tubular extension member and having adjustable connection with the coupling sleeve, a second sleeve mounted upon and secured to the coupling sleeve, a flange on the second sleeve extended over the connection between the tubular part and coupling sleeve, an annular groove in the outer face of the flange, a bar attached to the tubular part and having a downturned end for engagement in said groove.

5. In combination, a conduit having a tubular extension at its end, said tubular extension having a flange intermediate its ends, a sleeve slidable and rotatable on said tubular extension and on one side of said flange, said sleeve having means for engaging a grease cup, a member slidable and rotatable on said tubular extension on the other side of said flange and having threads engaging the adjacent end of said sleeve, resilient means at the end of said tubular extension for forming a grease tight joint between said tubular extension and said grease cup whereby rotation of said member in one direction secures said flange between said sleeve and said member, and secures said tubular extension and said grease cup together.

6. In combination, a conduit having a tubular part at its end provided with a flange intermediate its ends, a sleeve slidable and rotatable on said tubular part on one side of said flange and having means for detachable engagement with a grease cup, a gasket movable in said sleeve to engage against the end of said grease cup, a second sleeve fixed to the first sleeve and having a flange spaced therefrom, and a member rotatably engaging and interlocking a part of said first-mentioned flange and having an annular portion disposed between said sleeves, said annular portion being threaded to said first mentioned sleeve, whereby when said last-mentioned member is rotated in one direction it will pull said sleeves and tubular member into tight engagement and prevent rotation of the coupling relative to said grease cup.

In testimony whereof, I have hereunto signed my name.

WALTER M. MAYER.